Figure 1:
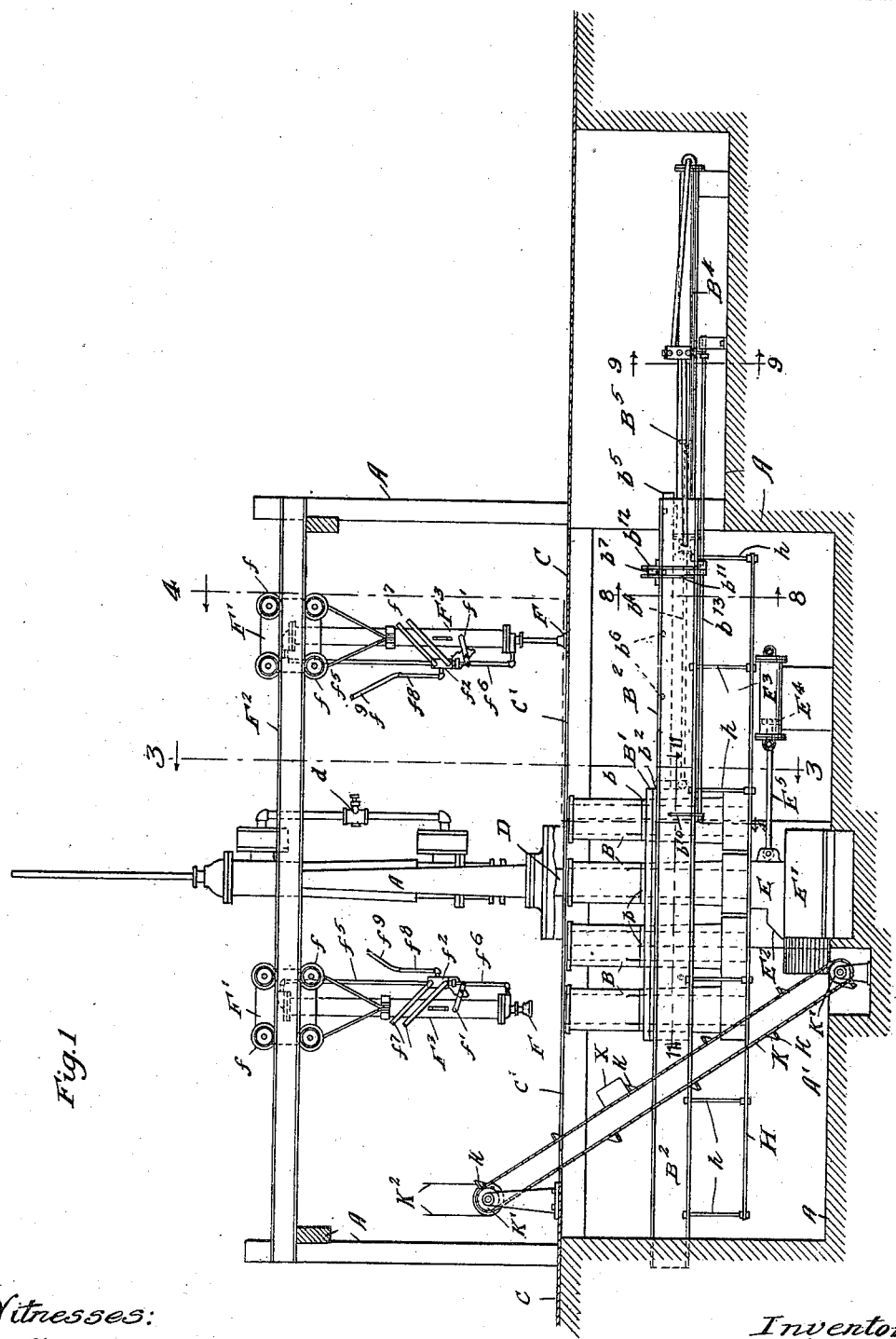

S. W. EGBERT.
METAL SCRAP COMPRESSOR.
APPLICATION FILED MAR. 16, 1908.

975,844.

Patented Nov. 15, 1910.
5 SHEETS—SHEET 1.

Witnesses:
Wm. Geiger
H. W. Munday

Inventor:
Solomon W. Egbert
By Munday, Evarts, Adcock & Clarke.
Attorneys

S. W. EGBERT.
METAL SCRAP COMPRESSOR.
APPLICATION FILED MAR. 16, 1908.

975,844.

Patented Nov. 15, 1910.
5 SHEETS—SHEET 2.

Witnesses:
Wm. Geiger
H. W. Munday

Inventor:
Solomon W. Egbert
By Munday, Evarts, Adcock & Clarke.
Attorneys

S. W. EGBERT.
METAL SCRAP COMPRESSOR.
APPLICATION FILED MAR. 16, 1908.
975,844.
Patented Nov. 15, 1910.
5 SHEETS—SHEET 3.
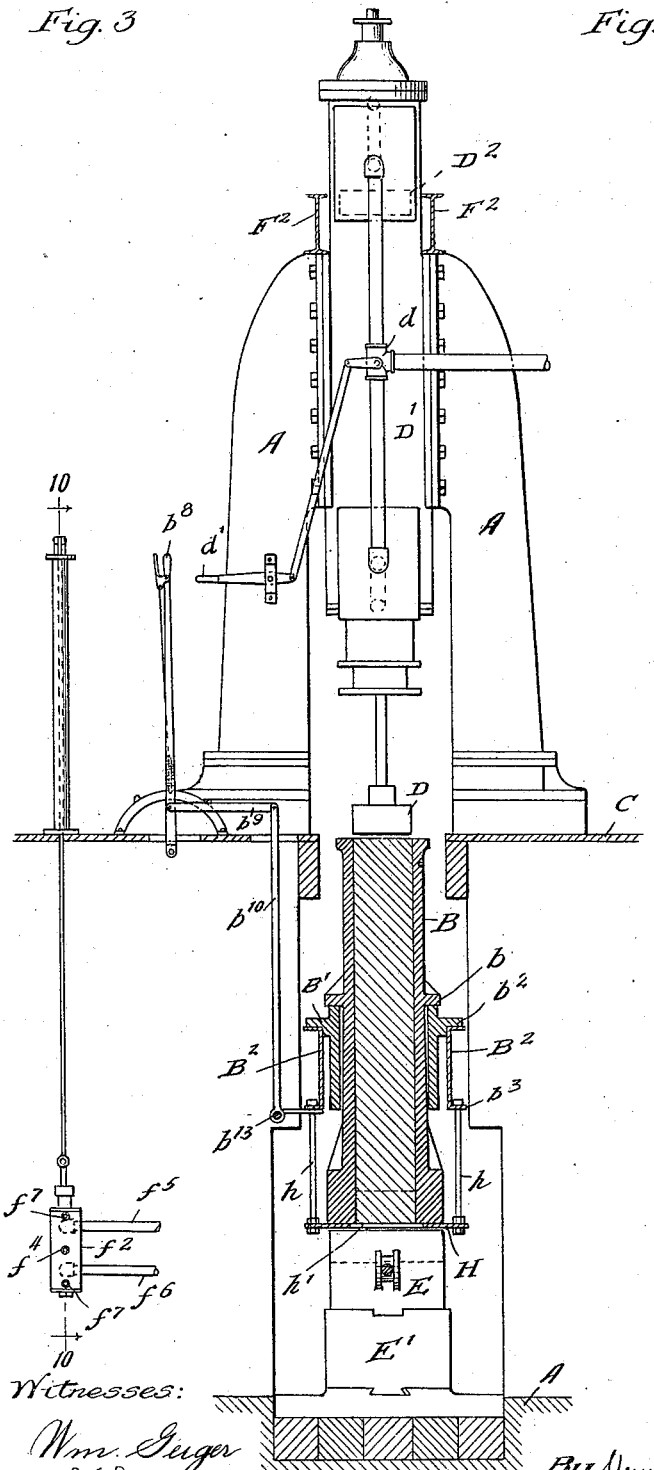
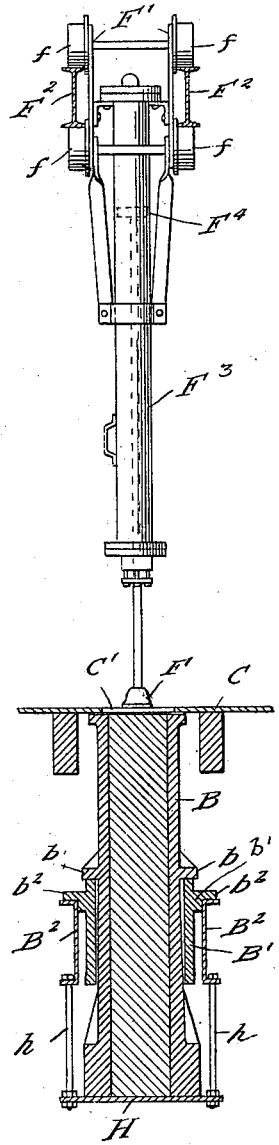
Fig. 3
Fig. 4
Witnesses:
Wm. Geiger
N. W. Munday
Inventor:
Solomon W. Egbert
By Munday, Evarts, Adcock & Clarke,
Attorneys

S. W. EGBERT.
METAL SCRAP COMPRESSOR.
APPLICATION FILED MAR. 16, 1908.

975,844.

Patented Nov. 15, 1910.

5 SHEETS—SHEET 4.

Witnesses
Wm. Geiger

Inventor:
Solomon W. Egbert
By Munday, Evarts, Adcock & Clarke
Attorneys

S. W. EGBERT.
METAL SCRAP COMPRESSOR.
APPLICATION FILED MAR. 16, 1908.

975,844.

Patented Nov. 15, 1910.

5 SHEETS—SHEET 5.

Witnesses:
Wm. Geiger

Inventor;
Solomon W. Egbert
By Munday, Evarts, Adcock & Clarke.
Attorneys

UNITED STATES PATENT OFFICE.

SOLOMON W. EGBERT, OF JOLIET, ILLINOIS, ASSIGNOR TO AMERICAN CAN COMPANY, OF NEW YORK, N. Y., A CORPORATION OF NEW JERSEY.

METAL-SCRAP COMPRESSOR.

975,844.  Specification of Letters Patent.  Patented Nov. 15, 1910.

Application filed March 16, 1908. Serial No. 421,561.

*To all whom it may concern:*

Be it known that I, SOLOMON W. EGBERT, a citizen of the United States, residing in Joliet, in the county of Will and State of Illinois, have invented a new and useful Improvement in Metal-Scrap Compressors, of which the following is a specification.

My invention relates to compressors for sheet metal scrap or other materials.

The object of my invention is to provide a sheet metal scrap compressor, of a strong, simple, efficient and durable construction, by means of which sheet metal scrap, such for example as that produced by can factories, may be rapidly, conveniently and cheaply compressed into blocks or billets of 50 or 100 pounds or other desired weight and with little hand labor.

My invention consists in the means I employ to practically accomplish this object or result; that is to say it consists in a horizontally and longitudinally reciprocating cage or carriage furnished with a plurality of molds, preferably four, so that the scrap may be filled and condensed into one pair of them while it is being compressed into a solid block in one of the other pair, and the compressed block ejected therefrom, in combination with a compressing hammer, preferably a steam hammer, a reciprocating anvil block adapted to be moved under the compressing hammer during the compressing of the condensed scrap in each mold and to be withdrawn from under the same to permit the compressing hammer to eject the solid or compressed block of scrap from the mold, and a pair of traveling scrap condensing plungers, preferably pneumatic, for condensing the loose scrap in the mold as it is filled into the same by the workmen, one of said condensing plungers being mounted to travel on a suitable longitudinal track at each side of the compressing hammer, so that it may be easily and quickly shifted over each and both of the pair of molds being filled.

The invention further consists in the novel devices and novel combinations or parts and devices herein shown or described.

Figure 2:
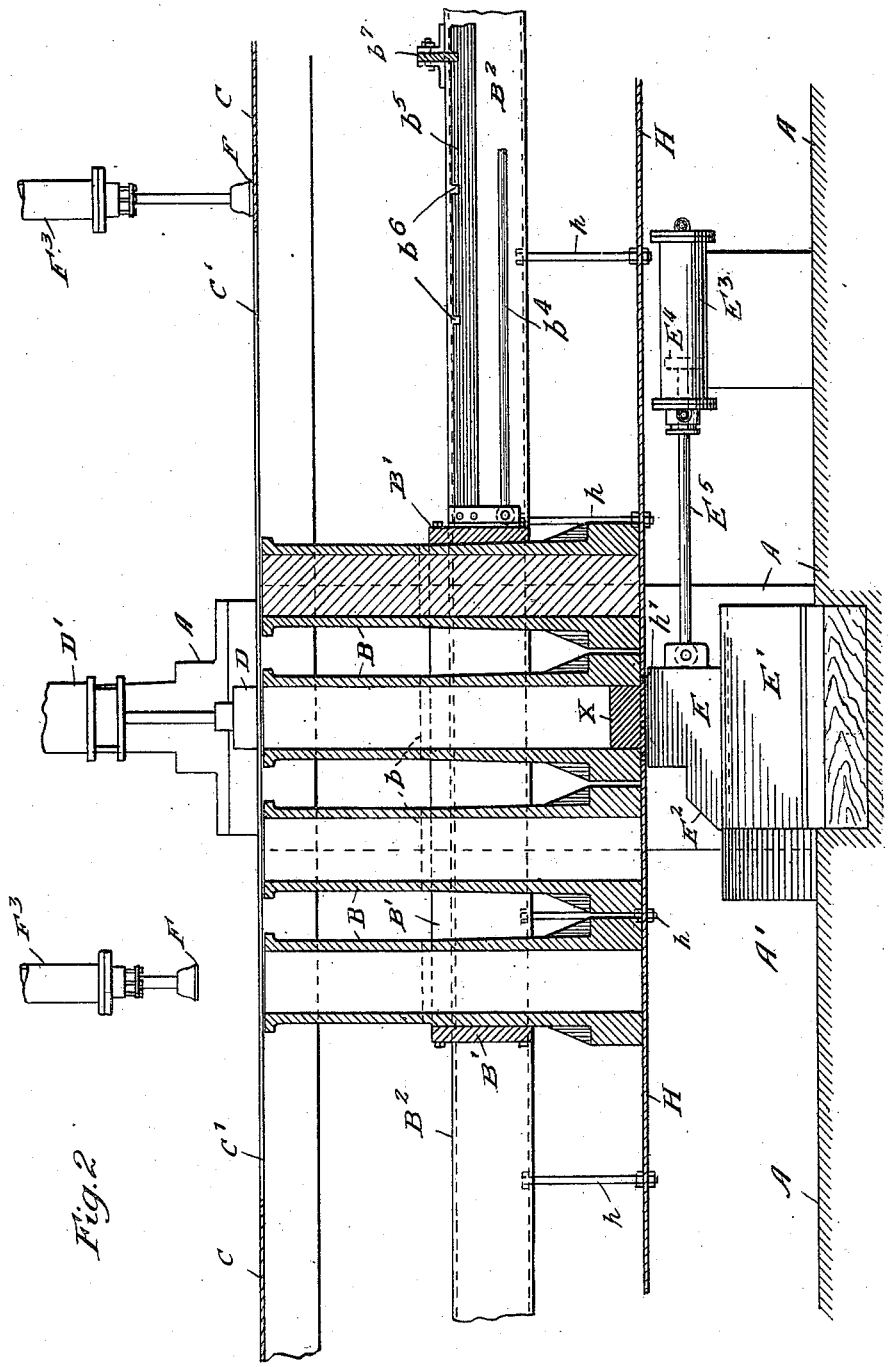
Figure 5:
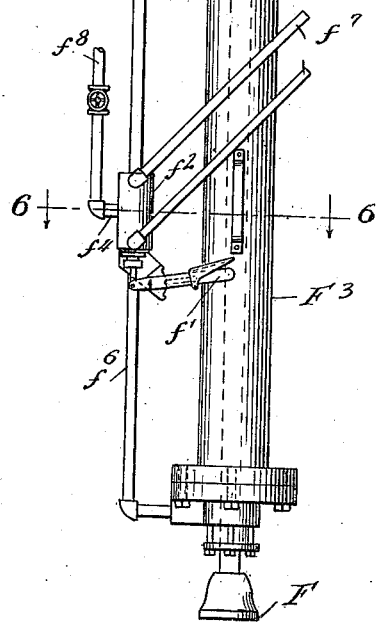
Figure 6:
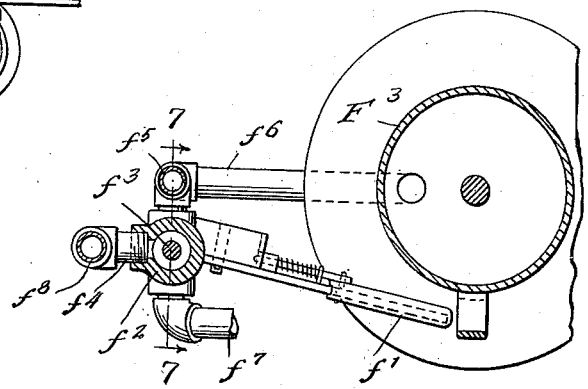
Figure 7:
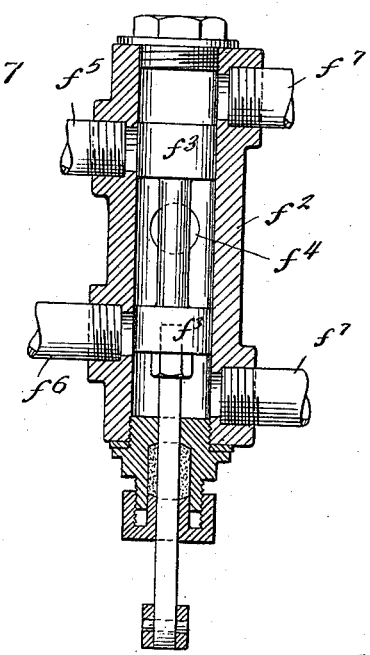
Figure 8:
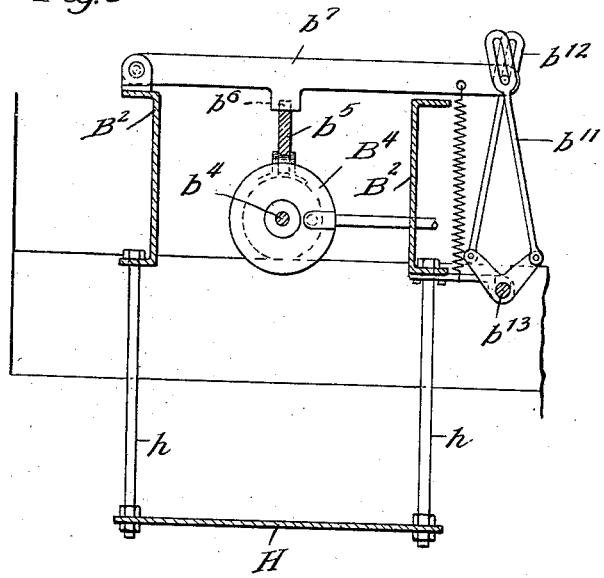
Figure 9:
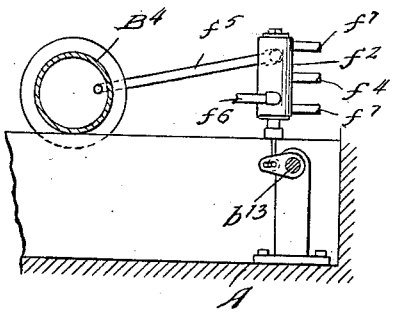
Figure 10:
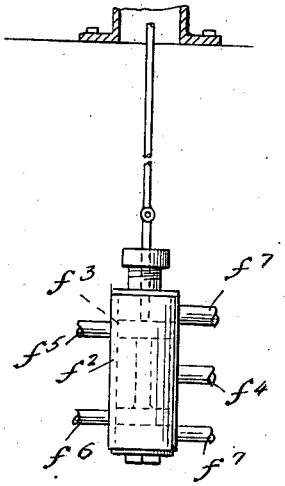
Figure 11:
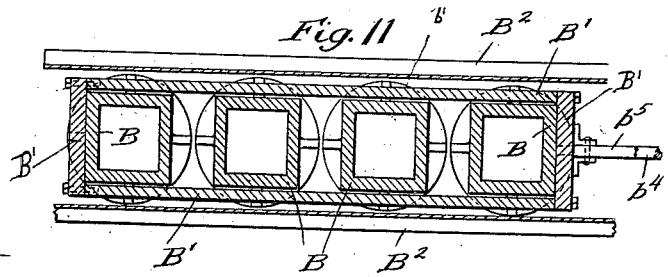

In the accompanying drawing, forming a part of this specification, Figure 1 is a side elevation, partly in longitudinal section, of a scrap compressor embodying my invention; Fig. 2 is a partial central vertical longitudinal section; Fig. 3 a cross section on line 3—3 of Fig. 1; Fig. 4 a cross section on line 4—4 of Fig. 1; Fig. 5 a detail side elevation of one of the traveling pneumatic scrap condensing plungers or devices; Fig. 6 a horizontal section on line 6—6 of Fig. 5; Fig. 7 a vertical section on line 7—7 of Fig. 6; Fig. 8 a detail vertical cross section on line 8—8 of Fig. 1; Fig. 9 is a detail vertical section on line 9—9 of Fig. 1; Fig. 10 a detail view, partly in section, on line 10—10 of Fig. 3; Fig. 11 a detail horizontal section on line 11—11 of Fig. 1.

In the drawing A represents the general frame and foundation work of the apparatus, B are the molds, $B^1$ the mold carriage or slide, $B^2$ the track for the mold carriage or slide $B^1$, C the feed plate or floor from which the tin plate or other scrap is fed into the molds B, D the steam compressing hammer, E a reciprocating anvil block adapted to be moved under the compressing hammer, $E^1$ the anvil, F F the condensing plungers or devices, preferably pneumatic, one on each side of the steam hammer D, $F^1$ the trucks or carriages for the condensing plungers, $F^2$ the track for the traveling trucks $F^1$ of the pneumatic scrap condensers F, H the bottom plate which closes the lower ends of the molds, and K the conveyer for the compressed blocks of metal scrap as the same are discharged from the molds, the movable anvil block operating to push them onto the conveyer.

The molds B are preferably four in number, and each is preferably provided with shoulders $b$ for engaging the mold carriage or cage $B^1$ in which the molds fit and by which they are reciprocated horizontally and in a longitudinal direction so as to bring each mold in turn under the steam compressing hammer D. The molds B are preferably made in separate pieces and each in a separate piece from the mold carriage or cage $B^1$. The mold carriage or cage $B^1$ is preferably of a rectangular shape in horizontal section, as illustrated in Fig. 11, and its side bars $b^1$ are furnished with guide flanges $b^2$, adapted to fit and reciprocate upon the stationary guide bars or rails $B^2$ which constitute the track for the mold carriage or slide $B^1$. The track rails or bars $B^2$ are also furnished with flanges $b^3$ at their lower edges.

The mold carriage or slide $B^1$ is preferably reciprocated as required by a hydraulic cylinder and piston $B^4$ $B^5$, the stem or rod $b^4$ of the piston being connected to the mold carriage or slide $B^1$.

The reciprocating mold carriage or slide $B^1$, or its operating stem or rod $b^4$ is provided with a registering bar or rod $b^5$, having registering notches $b^6$ which engage a movable registering pin or device $b^7$ mounted on the main frame of the machine to cause the molds to be brought into proper registration with the steam hammer D, anvil $E^1$ and movable anvil block E. The stop or registering device $b^7$ is operated at intervals as required by means of a hand lever $b^8$ and suitable connecting link and levers $b^9$ $b^{10}$ $b^{11}$ and $b^{12}$ on the shaft $b^{13}$.

The feed plate or floor C from which the scrap is fed into the molds B is provided on each side of the compressing hammer D with feed opening $C^1$ through which the scrap is fed or delivered into the molds B from both sides and from time to time condensed therein by the traveling condensing plungers or devices F.

The compressing hammer D is preferably a steam hammer and actuated by a steam cylinder and piston $D^1$ $D^2$ and provided with a controlling valve $d$ and operating lever $d^1$, and suitably mounted on the main frame or foundation work of the apparatus.

The reciprocating anvil block E is mounted to slide upon the anvil $E^1$, so that it may be brought under or in line with the compressing plunger or hammer D so as to close the lower end of the mold in which the scrap is being compressed by said hammer D, and so that it may be withdrawn from under the mold to permit the compressing hammer to eject or discharge the compressed block from the mold. The movable anvil block E is preferably furnished with a notched or inclined face $E^2$ to cause the compressed block of scrap to be properly delivered or to slide onto the conveyer K. The movable block E is preferably reciprocated as required by means of a hydraulic cylinder and piston $E^3$ $E^4$ and a rod $E^5$ connecting the movable anvil block E with the piston $E^4$ of the hydraulic cylinder $E^3$.

The scrap condensing or tamping devices or plungers F are preferably operated each by a pneumatic cylinder and piston $F^3$ $F^4$, the cylinder $F^3$ being mounted upon the traveling carriage $F^1$, which is preferably furnished with upper and lower flanged wheels $f$ to engage above and below the track rails $F^2$, and thus hold the truck or carriage $F^1$ securely in position on the track rails while permitting it to be easily and quickly pushed along the track rails to bring the condensing or tamping plunger over either one of the two or more molds B which are being simultaneously filled with the scrap by the workmen. The operation of the pneumatic scrap condensing or tamping plungers F are controlled from the hand levers $f^1$ through suitable valve mechanisms $f^2$ $f^3$ which govern the admission and exhaust of compressed air to the pneumatic cylinders $F^3$ in through the compressed air supply pipes $f^8$ $f^4$ $f^5$ $f^6$, and out through the exhaust pipes $f^7$. The compressed air supply pipe $f^8$ has a flexible section $f^9$ so that the trolley or truck $F^1$ may be freely moved on the track $F^2$.

The valves for controlling the admission and exhaust of steam to the cylinder of the steam hammer and of water to the hydraulic cylinders which operate the mold carriage and the anvil block may be of any suitable construction, but are preferably of substantially the same construction as that above described for the pneumatic cylinder of the scrap condensing or tamping plungers.

The bottom plate H is preferably supported from the track rails $B^2$ of the mold carriage by connecting rods $h$. This bottom plate is furnished with an opening $h^1$ therein which registers with the steam hammer D and the anvil block E when said anvil block is under the steam hammer, so that when the anvil block is withdrawn the hammer D may eject the solid or compressed block of scrap X through this opening $h^1$. The bottom plate H serves to close the bottom of the molds B while they are being filled, and to resist the pressure of the pneumatic condensing or tamping plungers F.

The conveyer K is preferably an endless chain conveyer, the links of which are furnished with arms $k$ to engage the solid or compressed blocks of scraps X. This conveyer K receives the blocks of scrap as they are discharged upon it from the molds by operation of the steam hammer D and reciprocating anvil block E, and operates to convey the blocks X out of the pit $A^1$ beneath the feed floor or plate C. The conveyer K is mounted upon sprocket wheels $K^1$ and is continuously driven through suitable operating mechanism $K^2$.

I claim:

1. In a metal scrap compressor, the combination with a compressing hammer, of a pair of movable tamping plungers, one on each side of the compressing hammer, a longitudinally reciprocatory mold carriage furnished with a plurality of molds, an anvil, a movable anvil block and a stationary bottom plate having an opening therein in line with the compressing hammer, substantially as specified.

2. In a metal scrap compressor, the combination with a compressing hammer, of a pair of movable tamping plungers, one on each side of the compressing hammer, a longitudinally reciprocatory mold carriage furnished with a plurality of molds, an anvil, a movable anvil block, a stationary plate closing the lower end of said molds when under said tamping plungers and having an opening therein in line with the compressing hammer, and a conveyer upon which the solid or compressed blocks of scrap are delivered as they are discharged from the mold by the compressing hammer and movable anvil block, substantially as specified.

3. In a scrap compressor, the combination with a compressing hammer, of a reciprocatory slide or carriage furnished with a series of molds, a cylinder and piston for reciprocating said mold carriage, registering means for registering each mold with the compressing hammer, a stationary bottom plate having an opening registering with the compressing hammer and closing the lower end of said molds when in filling position, an anvil, a movable anvil block, a tamping plunger, a cylinder and piston for operating said tamping plunger, a wheeled truck carrying said tamping plunger and its operating cylinder and piston, and a track for said wheeled truck to enable the tamping plunger to be alternately brought over a plurality of molds being filled, substantially as specified.

4. In a scrap compressor, the combination with a compressing hammer, of a reciprocatory slide or carriage furnished with a series of molds, a cylinder and piston for reciprocating said mold carriage, registering means for registering each mold with the compressing hammer, a stationary bottom plate having an opening registering with the compressing hammer and closing the lower end of said molds when in filling position, an anvil, a movable anvil block, a cylinder and piston for operating said movable anvil block, a tamping plunger, a cylinder and piston for operating said tamping plunger, a wheeled truck carrying said tamping plunger and its operating cylinder and piston, a track for said wheeled truck to enable the tamping plunger to be alternately brought over a plurality of molds being filled, and a second tamping plunger and operating cylinder, piston and wheeled truck therefor, one of said tamping plungers being on each side of the compressing hammer, substantially as specified.

5. In a scrap compressor, the combination with a compressing hammer, of a reciprocatory slide or carriage furnished with a series of molds, a cylinder and piston for reciprocating said mold carriage, reciprocating means for registering each mold with the compressing hammer, a stationary bottom plate having an opening registering with the compressing hammer and closing the lower end of said molds when in filling position, an anvil, a movable anvil block, stationary rails or bars upon which said mold carriage reciprocates, said bottom plates being suspended or supported from said rails or bars, substantially as specified.

6. In a compressor, the combination with a compressing hammer, of a plurality of movable molds, an anvil, a movable anvil block, a stationary bottom plate having an opening registering with the compressing hammer and closing the lower end of said molds when in filling position, and a movable trolley carried tamping plunger, substantially as specified.

SOLOMON W. EGBERT.

Witnesses:
H. M. MUNDAY,
PEARL ABRAMS.